(12) United States Patent
Vice

(10) Patent No.: US 8,363,144 B2
(45) Date of Patent: *Jan. 29, 2013

(54) OPERATOR CONTROL UNIT WITH TRACKING

(75) Inventor: Jack Vice, Stafford, VA (US)

(73) Assignee: Anthrotronix, Inc., Silver Spring, MD (US)

( * ) Notice: Subject to any disclaimer, the term of this patent is extended or adjusted under 35 U.S.C. 154(b) by 574 days.

This patent is subject to a terminal disclaimer.

(21) Appl. No.: 12/510,835

(22) Filed: Jul. 28, 2009

(65) Prior Publication Data

US 2010/0020223 A1 Jan. 28, 2010

Related U.S. Application Data

(63) Continuation-in-part of application No. 10/739,603, filed on Dec. 18, 2003, now Pat. No. 7,567,282.

(51) Int. Cl.
*H04N 5/225* (2006.01)
(52) U.S. Cl. ............... 348/333.02; 348/207.99
(58) Field of Classification Search ............. 348/207.99, 348/216.1, 217.1, 333.01, 333.02, 376; 345/7, 345/8
See application file for complete search history.

(56) References Cited

U.S. PATENT DOCUMENTS

| 5,262,838 | A | 11/1993 | Tocher |
| 5,365,218 | A | 11/1994 | Otto |
| 5,491,510 | A | 2/1996 | Gove |
| 5,623,335 | A | 4/1997 | Bamberger |
| 5,838,330 | A | 11/1998 | Ajima |
| 5,841,409 | A | 11/1998 | Ishibashi et al. |
| 6,083,353 | A | 7/2000 | Alexander, Jr. |
| 6,181,302 | B1 | 1/2001 | Lynde |
| 7,567,282 | B2 * | 7/2009 | Vice ................ 348/333.02 |
| 2003/0043268 | A1 | 3/2003 | Mann |
| 2004/0167682 | A1 | 8/2004 | Beck et al. |
| 2005/0134716 | A1 * | 6/2005 | Vice ................ 348/333.02 |
| 2008/0052000 | A1 * | 2/2008 | Furstenberg ............ 701/214 |

FOREIGN PATENT DOCUMENTS

EP 0790734 8/1997

* cited by examiner

*Primary Examiner* — Aung S Moe
(74) *Attorney, Agent, or Firm* — Lieberman & Brandsdorfer, LLC

(57) ABSTRACT

An apparatus equipped with an electronic camera, lensed optics, and a visual display in communication with the optics. An analog or digital video signal is conveyed to an operator of the apparatus through the visual display. The apparatus includes an embedded processor to track the orientation and position of the apparatus. Orientation and position information of the apparatus is used to dynamically recalculate display information. In addition, the apparatus may be in communication with a remote device having digital camera optics. Orientation and position information of the apparatus may be conveyed to the remote device to alter the orientation and position of the associated electronic camera optics. The global position and orientation data is refined through the use of a machine vision algorithm. Accordingly, data conveyed to the operator of the apparatus is in relation to the orientation and position of the apparatus and/or the associated orientation and position of the remote device.

19 Claims, 8 Drawing Sheets

OPERATOR CONTROL UNIT WITH TRACKING

CROSS REFERENCE TO RELATED APPLICATION(S)

The present application is a continuation-in-part utility application claiming the benefit of U.S. patent application Ser. No. 10/739,603, filed on Dec. 18, 2003, and titled "Operator Control Unit with Tracking," now pending, which is hereby incorporated by reference.

BACKGROUND OF THE INVENTION

1. Technical Field

This invention relates to an apparatus for remote communication. More specifically, the apparatus is adapted to convey information pertaining to the operator with respect to the locale of the apparatus and/or a remote device in communication with the apparatus.

2. Description of the Prior Art

Portable computing apparatus, such as laptop computers and personal digital apparatus are commonly used for remote computing needs and communication with computer systems and networks. A person utilizing such apparatus can enter data into the apparatus as long as the apparatus has an input device and source of power.

Many known portable computing apparatus contain communication electronics, such as a modem, to enable the operator to send and receive data to and from the apparatus and other computer systems or networks. Most modems require the operator to physically connect their apparatus to a telecommunication link. However, recently developments for communication apparatus capable of transmitting and receiving data from a remote device through a wireless connection include radio frequency transceivers. Accordingly, portable computing apparatus, which enable operators to remotely communicate with other devices and transmit data to and receive data from other devices, is common in the art.

There are several apparatus that enable remote communication. For example, laptop computers enable people to do computing from a relatively compact personal computer and transmit data through a connection to a network or other computer system. Similarly, personal digital apparatus with communications hardware enable users to do remote computing on a more limited basis and to transmit files to remote device through a communications connection to a computer network. However, neither the laptop nor the personal digital apparatus is designed to account for the physical environment of the unit in which the embedded processor is housed, and to communication the physical environment to the operator. In addition, laptops, personal digital apparatus, and similar computing apparatus are not generally designed to enable wireless communication with another remote device other than computer apparatus or enable bidirectional communication with such apparatus. Accordingly, what is desired is an embedded processor, which can be worn on a body part of the user, that enables remote wireless communication with a remote device while accounting for the physical environment and positioning of the processor.

SUMMARY OF THE INVENTION

This invention comprises a control unit for remote communication.

In one aspect of the invention, an operator control apparatus is provided with digital camera optics in communication with a visual display, with the optics configured to provide a digital video signal. An embedded processor is provided in communication with the optics. The processor tracks change to orientation and position of the apparatus and recalculates data to be displayed based on the change. A remote device is provided in communication with and separate from the apparatus. The remote device has an actuator that is configured to be controlled by an input device of the apparatus. The remote device communicates global position data of an object of interest to the processor, the data is then refined by one or more machine vision algorithms. The processor is configured to re-calculate location of the object of interest relative to the apparatus. In addition, the visual display employs an overlay to show a combination of data received from the optics local to the visual display and the remote device. This overlay provides position and orientation in three dimensional spaces to a location of the object relative to location and orientation of the apparatus.

In another aspect of the invention, a method is provided for remote communication. A digital video feed is provided to a visual display through optics. Orientation and position change of an apparatus in communication with said visual display are tracked. The orientation of a portion of a device remote from said apparatus is controlled through orientation of the apparatus. The remote device includes a global positioning sensor. Both global position and orientation data of an object of interest are communicated to the visual display. This communication includes refining the global position data with one or more machine vision algorithms. The visual display shows a combination of data received from the optics and the remote device, with the combination providing location data of an object relative to location of the apparatus.

In yet another aspect of the invention, an article is provided with optics in communication with a visual display. The optics are configured to provide a digital video signal. The article includes a computer-readable medium encoded with instructions to be executed by a computer. Instructions are provided to provide a digital video feed to a visual display through optics local to the visual display and remote from the visual display, and to track orientation and position of an apparatus in communication with the visual display. In addition, instructions are provided to control orientation of a portion of a device remote from the apparatus through orientation of the apparatus. Instructions are also provided to communicate global position of an object of interest as detected from the remote device to the visual display, including instructions to refine the global position and orientation data by employment of a machine vision algorithm. Finally, instructions are provided to present a combination of data collected by the local optics and the remote device, this combination providing location of an object relative to location of the apparatus.

Other features and advantages of this invention will become apparent from the following detailed description of the presently preferred embodiment of the invention, taken-in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated.

DESCRIPTION OF THE PREFERRED EMBODIMENT

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of vision and vision techniques, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

An apparatus for conveying local and/or remote information to an operator is provided. The positioning of the apparatus may control the information conveyed to the operator. An embedded processor of a control unit computes the position and orientation of the apparatus and gathers data associated therewith. One or more machine vision algorithms are employed to accurately refine the position and orientation calculations of the apparatus. Machine vision algorithms are used to recognize objects in three dimensional spaces. In addition, the apparatus may communicate with a remote device. The orientation of the apparatus may be used to control the orientation of the remote device, and associated data gathered from the remote device and transmitted to the apparatus. Accordingly, the position and orientation of the apparatus control the data gathered and conveyed to the operator.

Technical Details

Figure 1:
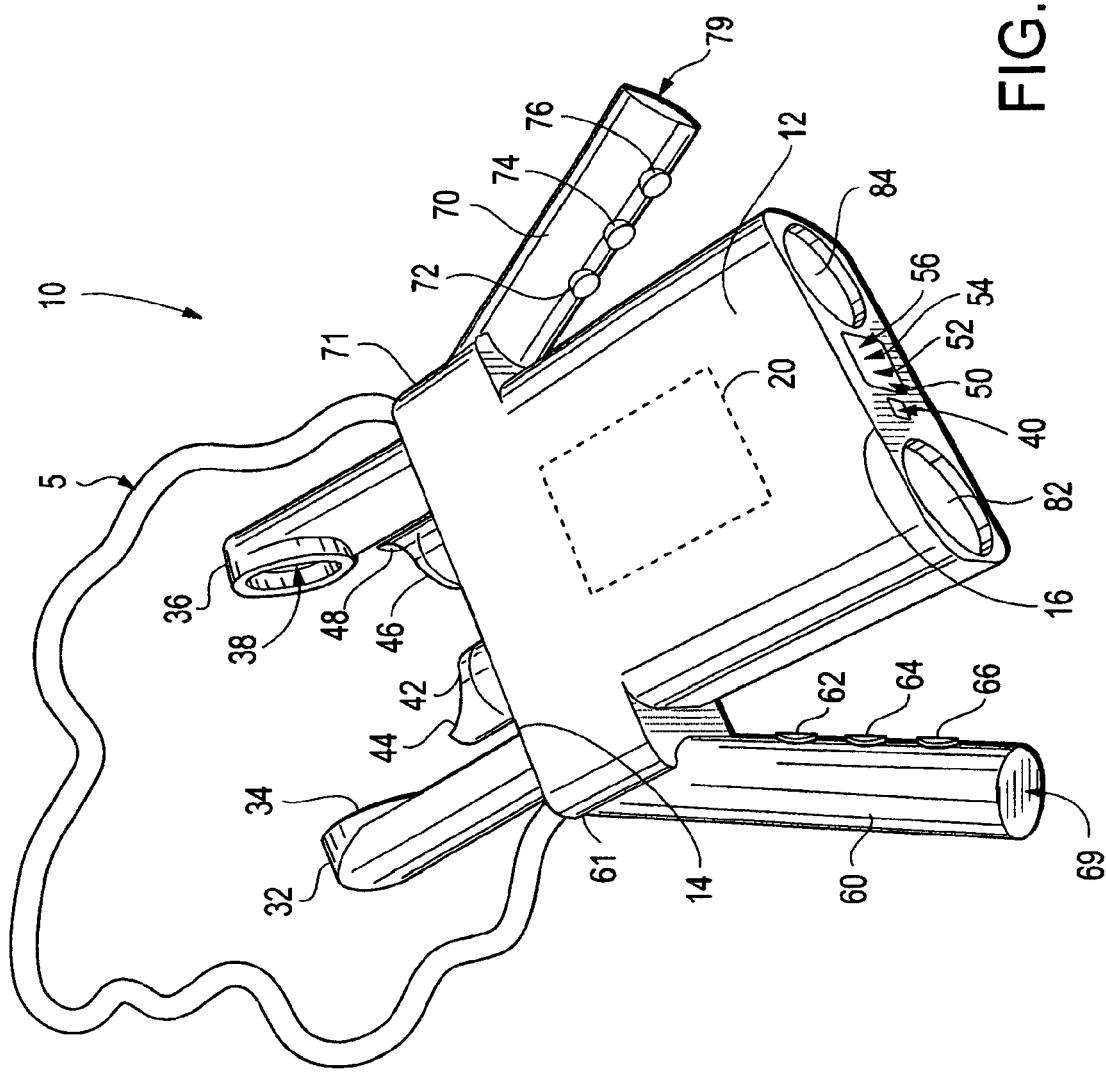
FIG. 1 is a perspective view of the operator control unit according to the preferred embodiment of this invention, and is suggested for printing on the first page of the issued patent.
Figure 7:
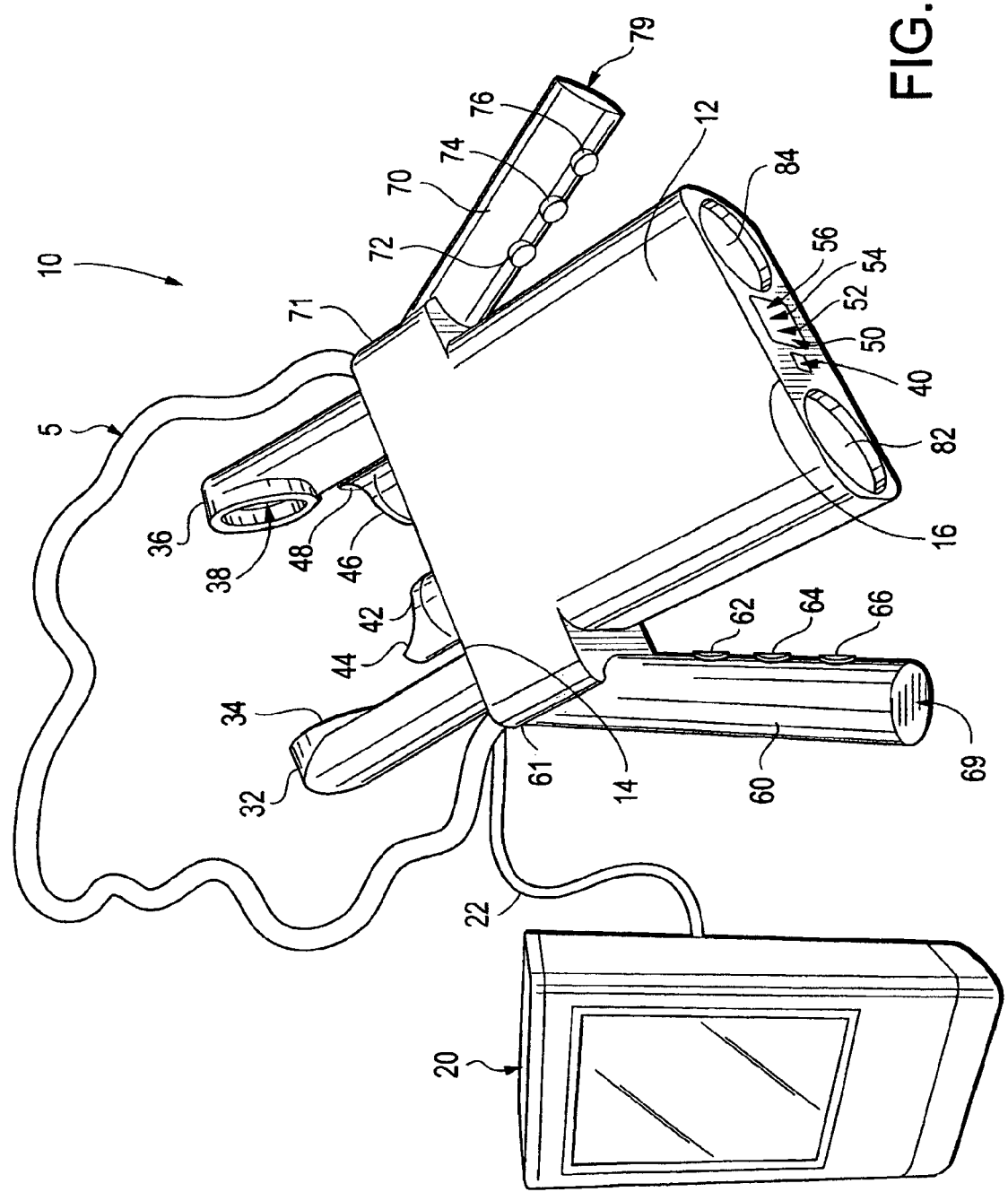
FIG. 7 is a perspective view of the operator control unit with a tethered computation device.

As shown in FIG. 1, the control unit 10 is in the physical form representative of a binocular. The control unit 10 may be hand held, or worn around a body part of the operator with a strap 5. The control unit 10 has a case 12 adapted to house internal components, such as sensors and I/O apparatus. Data processing is performed by a computation device 20 that is shown embedded to the control unit 10. However, in an alternative embodiment, as shown in FIG. 7, the computation unit 20 may be tethered to the control unit 10 by a signal and power cable 22. The computation unit 20 includes a computer with an embedded processor. Machine vision algorithms may run on the embedded processor of the computation unit 20 or on a separate processor. More specifically, the machine vision algorithm(s) will count, measure, and/or identify objects, dimensions, or other features in the image. In one embodiment, an edge and vertex detection algorithm identifies points in a digital image at which the image brightness changes, e.g. has discontinuities. The purpose of detecting sharp changes in image brightness is to capture important events and changes in properties. The result of applying an edge detector to an image is a set of connected curves that indicates the boundaries of the object(s), the boundaries of surface markings, as well as curves that correspond to discontinuities in surface orientation. Accordingly, application of an edge and vertex detection to an image reduces the amount of data to be processed and filters out information that may be regarded as less relevant, while preserving the important structural or environmental properties of an image in order to match these structural or environmental properties to pre-stored data.

Preferably, the embedded processor includes a wireless communication apparatus to enable communication between the embedded processor and a remote device. The case 12 has a proximal end 14 and a distal end 16. A set of ear pieces 32, 36 are mounted adjacent to the proximal end 14 for receipt of auditory data. External sound sources are damped by pliable material 34, 38 on the earpieces 32, 36, respectively, resulting in enhanced clarity of presentation of the auditory data to the operator. The control unit 10 has a directional microphone 40 to detect auditory data conveyed to the earpiece. Similarly, a set of eyepieces 42, 46 are mounted adjacent to the proximal end 14 for receipt and presentation of visual data to the operator. External light sources are shielded from the display using pliable material 44, 48 that conforms to the operator's face. Within the pliable material 44, 48 of eyepieces 42, 46 are pressure sensors (not shown) indicating proximity of the operators face with respect to the control unit. Both the ear and eye pieces are adapted to receive data in stereo format. In addition, the control unit 10 includes a light sensor 50, a light amplification sensor array 52, digital video camera optics (not shown), an infra-red amplification sensor array 54 to convey visual data to the operator through the eyepieces 42, 46, and lens optics 82 and 84 to provide a magnified analog display to the operator. Accordingly, the control unit 10 includes apparatus for conveying auditory and visual information to an operator of the unit.

In addition to conveying information to the operator of the unit, input apparatus are provided to collect data as well as enable communication between the operator and the unit, and/or between the operator and a remote device. A set of input devices 60 and 70 are provided on each lateral side of the control unit 10. The input devices preferably include additional input devices 62, 64, and 66, and 72, 74, and 76, shown in the form of tactile pushbuttons. Each of the input devices is mapped to a set of corresponding logical states in the control unit and/or a remote device. A logical state may correspond to activation of one or more actuators on the remote device. One or more of the input devices may be in the form of a proportional input device, such as a proportional input grip, as shown in FIG. 1. Each proportional input grip is preferably enclosed within neoprene boots (not shown) to protect the components of the proportional input grip from dust and moisture. Other materials may be used to insulate the proportional input grips from dust, moisture, electromagnetic interferences, and any other condition that would affect communication and operation of the proportional input grip. In addition, the boots function as a seal between the input device and the control unit case 12.

Each proportional input grip 60, 70 have a proximal end 61, 71 and a distal end 69, 79, respectively. The distal ends of the proportional input grips extend from a surface of the case 12 and may be actuated by the operator. Similarly, the proximal ends 61, 71 of the proportional input grips 60, 70 are connected to electronic circuits that reside within an interior section of the case 12. As the proportional input grip is revolved around its center axis, a signal is produced that corresponds to the degree of actuation. The signal is preferably in the form of a voltage output that preferably ranges from 0 to 5 volts, but may be calibrated for a lesser or greater output. As the proportional input grip 60, 70 is rotated about its axis, a proportional voltage is output to the associated electronic circuit. Alternatively, the proportional input grip may use optical motion detection, wherein an optical signal would be digitized at an analog to digital converter bypassing any electronic circuits. Actuation of the proportional input grip 60, 70 may be communicated to a respective logical state or motor of the remote device controlling direction, velocity and/or illumination for any apparatus adapted to receive the variable input. The signal from the circuit board associated with the proportional input device 60, 70 is processed by an analog to digital converter to digitize the data into a computer readable format. Following the digitizing process, the processed data is streamed to a communication port of the embedded processor. The radial proportional input grip motion described for the proportional input devices 60, 70 may be replaced by any other proportional movement that would be necessary to control the remote device. However, actuation of the proportional input grip is not limited to communication with a remote device. The proportional input grip may also be used to communicate with the visual display. Accordingly, the proportional input device functions as an input device in communication with the control unit 10 to provide a proportional signal to the embedded processor of the control unit and/or a remote device.

As with the proportional input devices 60, 70, the tactile buttons 62, 64, 66, 72, 74, 76 convey information from the operator to a circuit board associated therewith, which transmits the data to an analog-digital converter. Wired communication electronics are integrated into the analog-digital converter to digitize the data into a computer readable format and to communicate data received from the input device to the embedded processor or streamed to a communication port of the embedded processor. The tactile buttons may be used to communicate with either the visual display or the remote device, or both. Functionality associated with the tactile pushbuttons may include, switching modes of operation, switching proximity sensors, and navigation within a graphical user interface. Pressure sensors in the proportional input device, known in the art as "dead man" switches, control communication signals between the control unit 10 and the remote device. For example, a release of one of the pressure sensors sends a communication signal to the remote device to enter a safe state. Whereas, when the pressure sensor is engaged, communication between the control unit 10 and the remote device can be achieved. In a preferred embodiment, the tactile pushbuttons are separated by a silicone rubber membrane to prevent moisture and dust from entering the case 12. However, the membrane may be comprised of an alternative material that provides protection of the interior section of the case and associated circuit board(s) from damage due to dust, moisture, and environmental weather conditions. Accordingly, actuation of the tactile pushbuttons enables an operator of the unit to communicate a variety of signals to the embedded processor for local or remote communication.

The hardware components of the control unit 10 may be used to visually convey data from a remote device to an operator of the unit 10. Visual data are displayed to the operator on the visual display as seen through the eyepieces 42 and 46. There are four modes of operation for visual display, including a local situational awareness (LSAM), remote situational awareness (RSAM), first person map (FPMM), and bird's eye map (BEMM). The control unit 10 includes several apparatus to operate in each of these modes. For example, a global positioning system (GPS) sensor (not shown) is provided to convey the location of the control unit 10 to the embedded processor of the control unit. An electronic compass (not shown) and an electronic accelerometer (not shown) are provided to convey direction with respect to North and angle with respect to the Horizon, respectively, to the embedded processor of the control unit 10. Similarly, all position and orientation information gathered by the remote device are conveyed to the embedded processor of the control unit. In addition, a rangefinder 56 is provided both on the control unit 10 and the remote device. The rangefinder conveys distance to a specific object or location by calculating a range to objects of interest. In one embodiment, the rangefinder may be in the form of an electromagnetic signal. Accordingly, the apparatus of the control unit includes tools to collect appropriate data to enable the four modes of operation.

Figure 2:
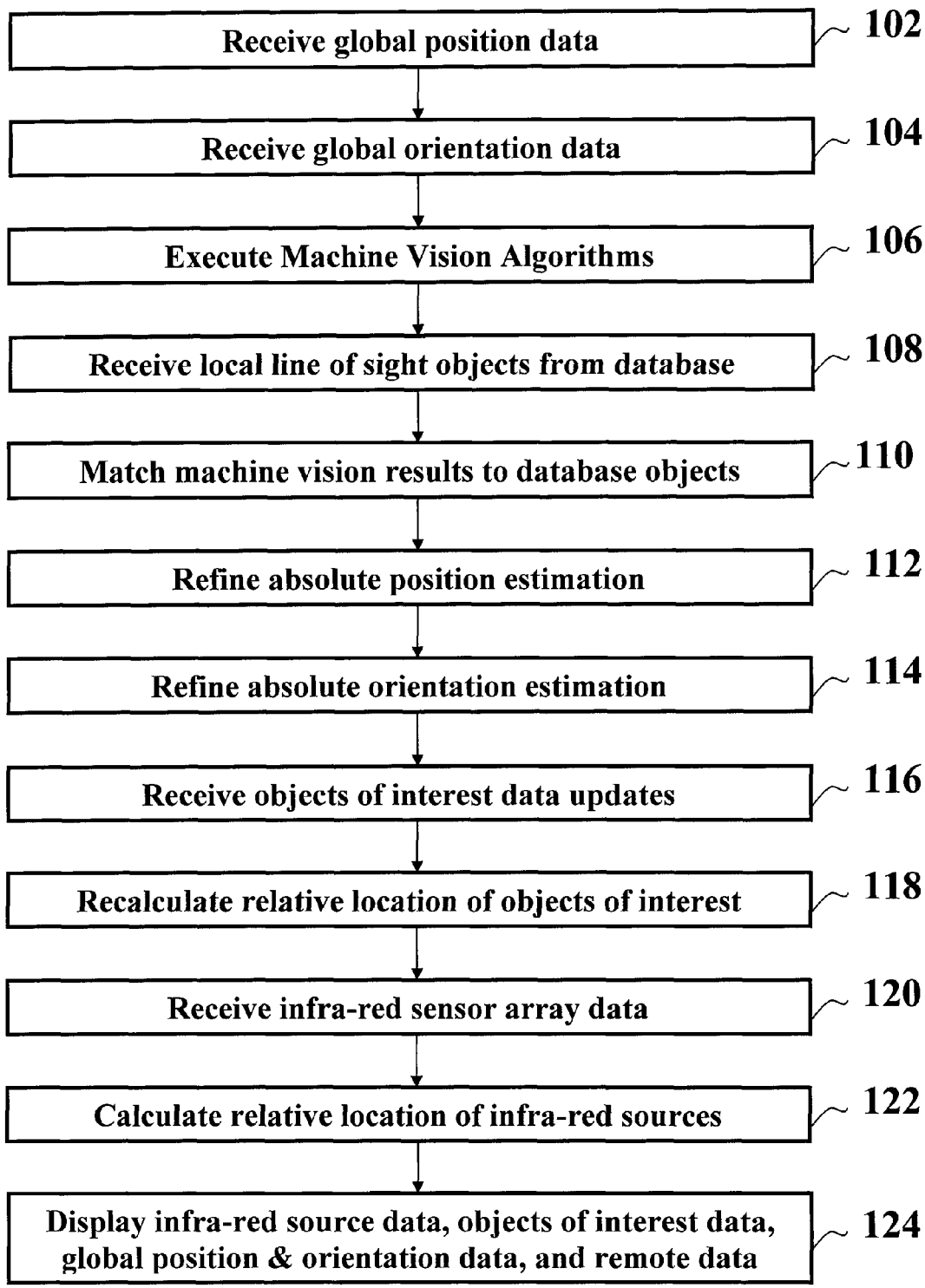
FIG. 2 is a flow diagram illustrating the local situational awareness mode.

FIG. 2 is a flow diagram 100 illustrating process of conveying data to an operator utilizing the local situational awareness mode (LSAM) of the control unit 10. When the control unit 10 is operated in the local situational awareness mode (LSAM), the operator can enhance his/her vision of immediate surroundings through video data from the light amplification sensor array 52, lens optics 82 and 84, or both. The first step in entering the local situational awareness mode is for the embedded processor of the control unit 10 to receive global position data from the GPS sensor of the control unit 102. Thereafter, the embedded processor of the control unit 10 receives global orientation data from the electronic accelerometer and electronic compass of the control unit 104. At step 106, one or more machine vision algorithms are executed to refine and increase the accuracy of calculations of position and orientation of data received in steps 102 and 104. In one embodiment, the machine vision algorithms allow one to recognize one or more objects within an image provided by optics. Following step 106, a database containing information as well as position data is searched for objects located within a local line of sight. In one embodiment, the database is a geographical database. The list of objects is received from the database at step 108, after which the object(s) recognized by the machine vision algorithms at step 106 are matched to one or more objects received from the database 110. Thereafter, the absolute position and orientation estimations for the control unit are refined at steps 112 and 114, respectively, using absolute position data for the object(s) obtained at step 110 from the database.

Following step 114, object data update is received 116. The location of the object(s) is re-calculated relative to the control unit 118. Thereafter, infra-red sensor array data is collected and received 120, and the location of the infra-red sources are calculated relative to the location of the control unit 122. Information gathered by the remote device or any other source(s) relative to the object(s) is displayed in a transparent overlay form relative to the actual position of the object(s) with respect to the position and orientation of the control unit 124. Such information may include infra-red source data. Accordingly, the local situational awareness mode (LSAM), together with the machine vision algorithm, calculates position and orientation in three dimensional spaces to accurately represent graphical overlays of environmental information to an operator of the control unit.

Figure 3:
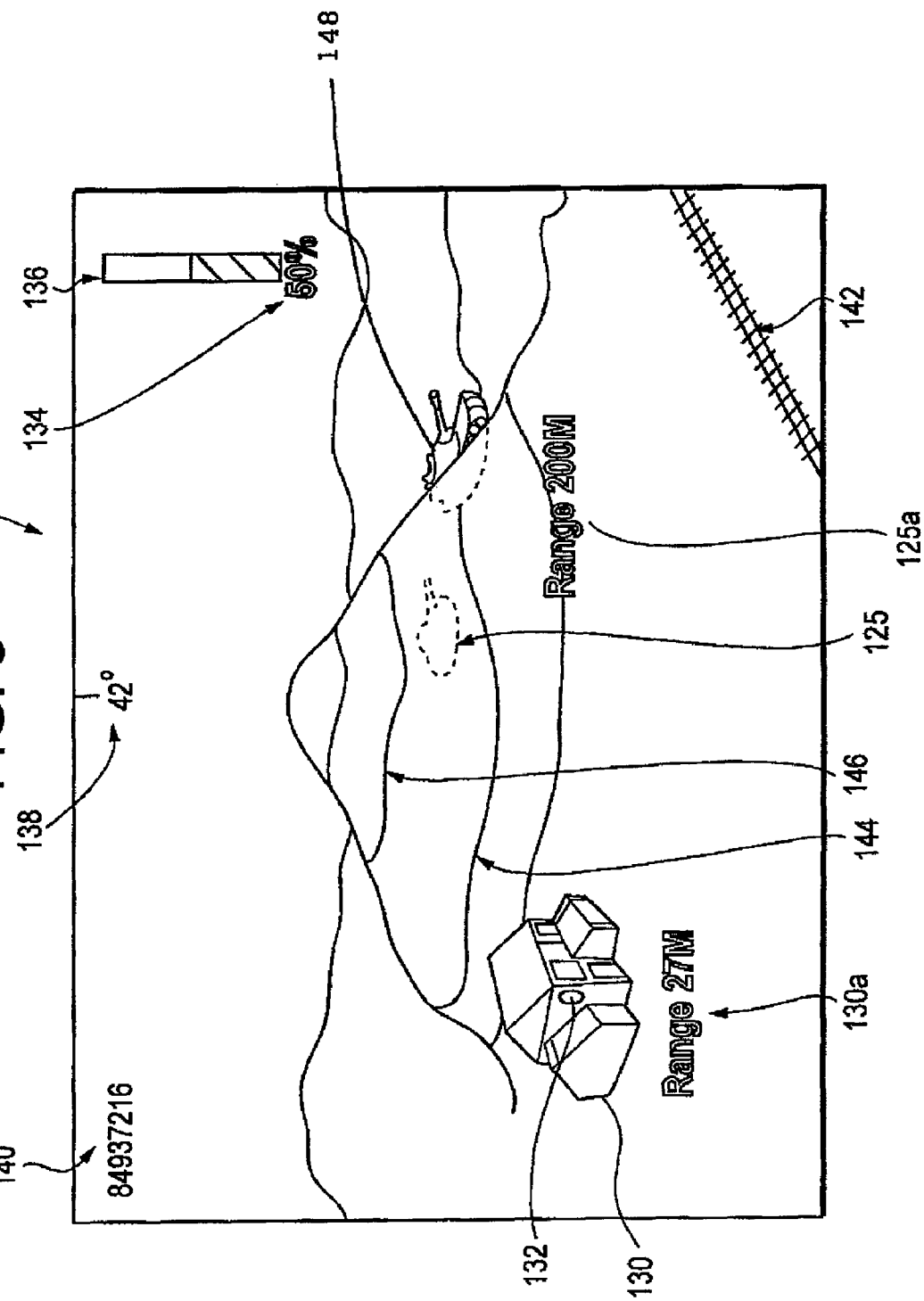
FIG. 3 is an illustration of a graphical user interface with data overlay.

The overlay information gathered can indicate the location of objects which are not directly visible to the operator. In addition, the overlay information provides information about objects which are visible to the operator. The execution of machine vision algorithms, as discussed above, provides accurate refinement of the absolute position of objects in three dimensions as well as accurate representation of graphical overlays of environmental information to the operator. FIG. 3 is a panoramic view 120 of a visual display in the local situational awareness mode (LSAM). There are two noted objects, object 125 which is not directly visible to the operator, and object 130 which is visible to the operator. The distance of the objects 125a and 130a to the control unit are noted adjacent to each object. In this example, the objects are 200 meters and 27 meters, respectively. Infra-red sensor data 132 is displayed relative to the actual location of the infra-red source. The data overlay display may optionally include telemetry data from the remote device 148 as transparent text 134 and/or graphics display 136. Global orientation data 138 and position information 140 may also be provided in the display. In addition, standard map symbols representing conventional objects are represented, as well as grid lines 144 and 146, representing topographical information. For example, a railway line 142 is shown. Accordingly, in the local situational awareness mode (LSAM), an operator of the control unit may enhance his/her vision of his/her surroundings through video data from the light amplification sensor array of the control unit and/or through lens optics of the control unit.

Figure 4:
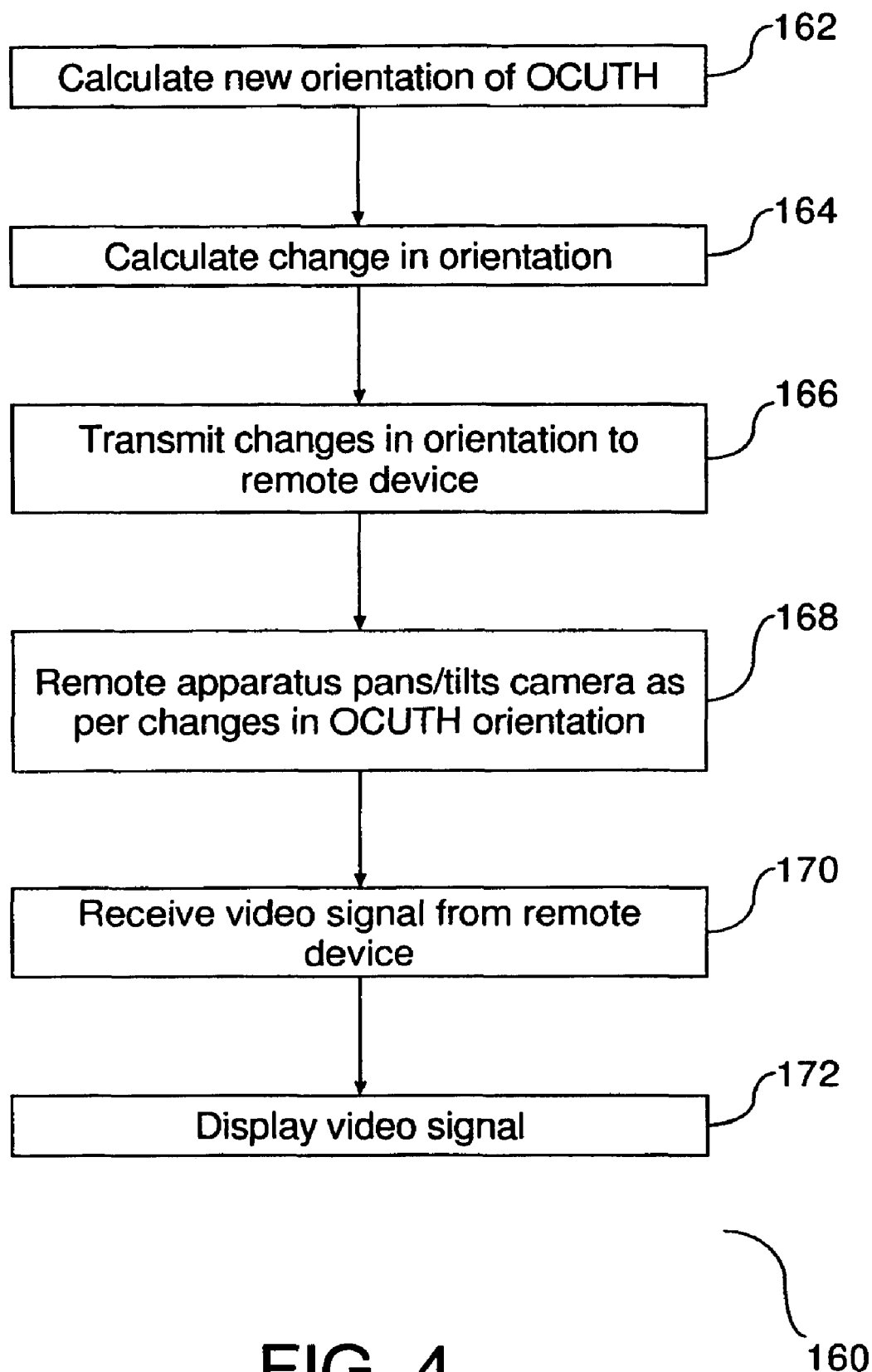
FIG. 4 is a flow diagram illustrating the remote situational awareness mode.

FIG. 4 is a flow diagram 160 illustrating a process of conveying data to an operator utilizing the remote situational awareness mode (RSAM) of the control unit. When the control unit 10 is operated in the remote situational awareness mode (RSAM), the operator requests a change in orientation of a camera in communication with the remote device. The camera gathers data and communicates that data to the control unit. In the remote situational awareness mode (RSAM), a change in the orientation of the control unit corresponds to new orientation data for the camera of the remote device. The first step in entering the remote situational awareness mode (RSAM) is to calculate the orientation of the control unit 162. Thereafter, any change in orientation from the prior position data of the control unit is calculated 164. The change in the orientation of the control unit is transmitted to the remote device 166. Following transmission of the orientation change, the remote device modifies the orientation and/or position of it's camera to reflect the changes communicated from the control unit 168. Thereafter, the control unit receives a video signal from the remote device 170, and displays the video signal to the operator 172. The purpose of the remote situational awareness mode (RSAM) is to convey a change in the positioning of the remote device and associated camera. The orientation of the control unit 10 directly controls the orientation of the video sensors on the remote device. The combination of sending orientation changes and receiving video signal(s) is a form of bi-directional communication between the control unit and the remote device. The bi-directional communication between the control unit and the remote device is interactive by its nature. The orientation and position of the video sensor on the remote device are mapped to coincide with the orientation and position of the control unit 10. Accordingly, the new orientation of the camera of the remote device enables the remote device to transmit data from a new orientation and to focus on changes in one or more objects or on one or more new objects.

Figure 5:
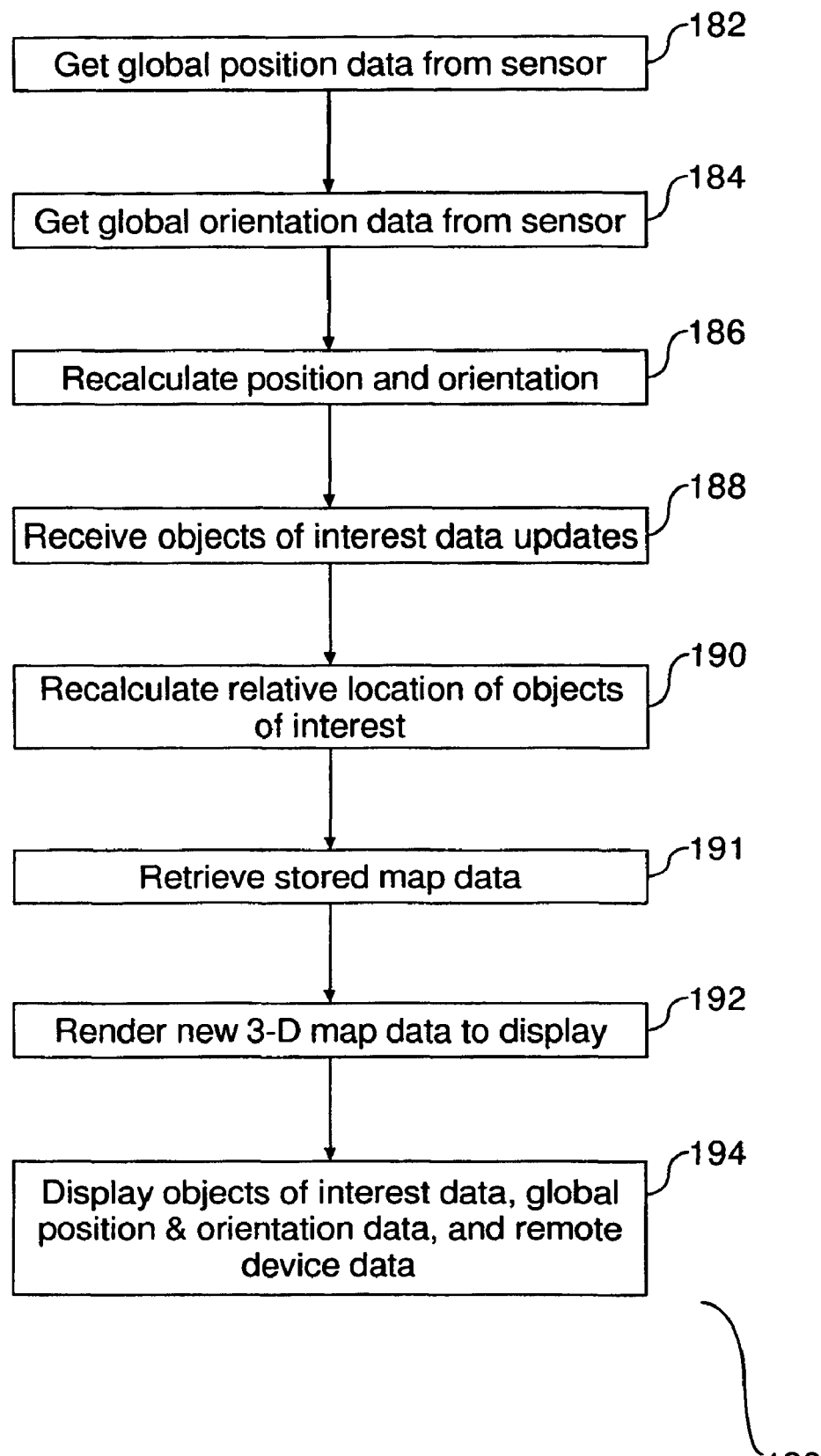
FIG. 5 is a flow diagram illustrating the birds eye map mode.

FIG. 5 is a flow diagram 180 illustrating the process of conveying map data to an operator utilizing the birds eye map mode (BEMM). The purpose of this mode is to provide three dimensional map data to the control unit visible to the operator through the visual display. Following initiation of the birds eye map mode, the embedded processor of the control unit 10 receives global position data from the GPS sensor of the control unit 182. Thereafter, the embedded processor of the control unit 10 receives global orientation data from the electronic accelerometer and electronic compass of the control unit 184. Upon receiving the data at steps 182 and 184, the processor calculates position and orientation of the control unit 186. Following receipt and calculation of control unit position data, object of interest data is received 188. In one embodiment, object data pertains to features of terrain and/or environment, and objects of interest data include tactical data as a subset of object data. The location of the object(s) of interest is calculated relative to the control unit 190. Map data is retrieved from a data storage medium in communication with the embedded processor of the control unit 191. Thereafter, a new three dimensional map is created and sent to the visual display of the control unit for use by the operator 192. Information gathered by the remote device or any other source(s) relative to the object of interest is displayed in an overlay form relative to the actual position of the object(s) of interest with respect to the position and orientation of the control unit 194. In the BEMM, the control unit 10 displays three dimensional map data to the operator as if the operator were a set distance above his/her current position, or that of the position of the remote device, i.e. looking down. The map information is displayed with proper orientation to north together with the current location of the control unit 10 and the remote device. In this mode, as the operator orients and changes the control unit 10, the map data changes accordingly. Preferably, terrain detail is displayed as a wireframe, and natural and artificial objects are displayed using standardized coded map symbols. Map data is stored in persistent memory and may be updated by satellite data and remote pilot vehicles. Accordingly, the birds eye map mode (BEMM) is intended to retrieve and convey map data based upon orientation of the control unit.

Figure 6:
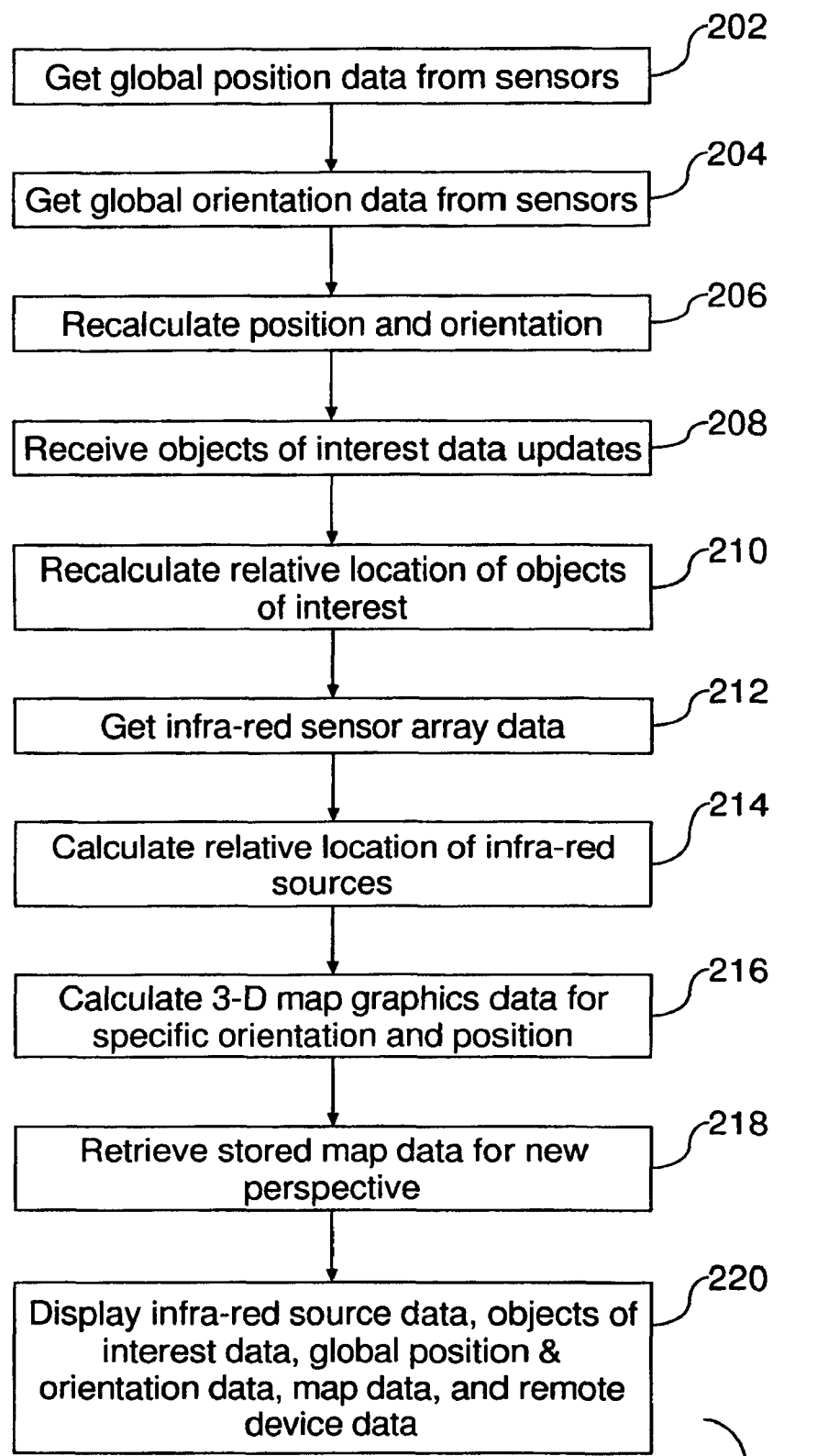
FIG. 6 is a flow diagram illustrating the first person map mode.

FIG. 6 is a flow diagram 200 illustrating the process of obtaining location for objects of interest in a first person map mode (FPMM). Global position data is obtained from a GPS sensor associated with the remote device 202. Thereafter global orientation data is obtained from an electronic compass associated with the control unit 204. The position and orientation of the remote device is recalculated from a prior calculation based upon readings obtained from the associated GPS sensor, electronic accelerometer, and electronic compass 206. Similarly, data associated with any objects of interest must be obtained 208. Thereafter, the location of the objects of interest is re-calculated based upon any new position data obtained from the remote device 210. Following step 210, infra-red sensor array data is collected 212 and calculated relative to the position of the infra-red sources 214. Once all of the data from the remote device and objects of interest are obtained, three dimensional graph data for a specific orientation and position is calculated 216. Map data is retrieved from a data storage medium in communication with the embedded processor of the control unit 218. Thereafter, a map is made visible to the operator of the control unit through the visual display 220. The map is preferably a three dimensional map with data projected as transparent overlay graphics. The project data includes infra-red source data, objects of interest, global position and orientation data, map data, and remote device data.

Embodiments within the scope of the present invention also include articles of manufacture comprising program storage means having encoded therein program code to communicate data between the input device and data presented on the visual display. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

Figure 8:
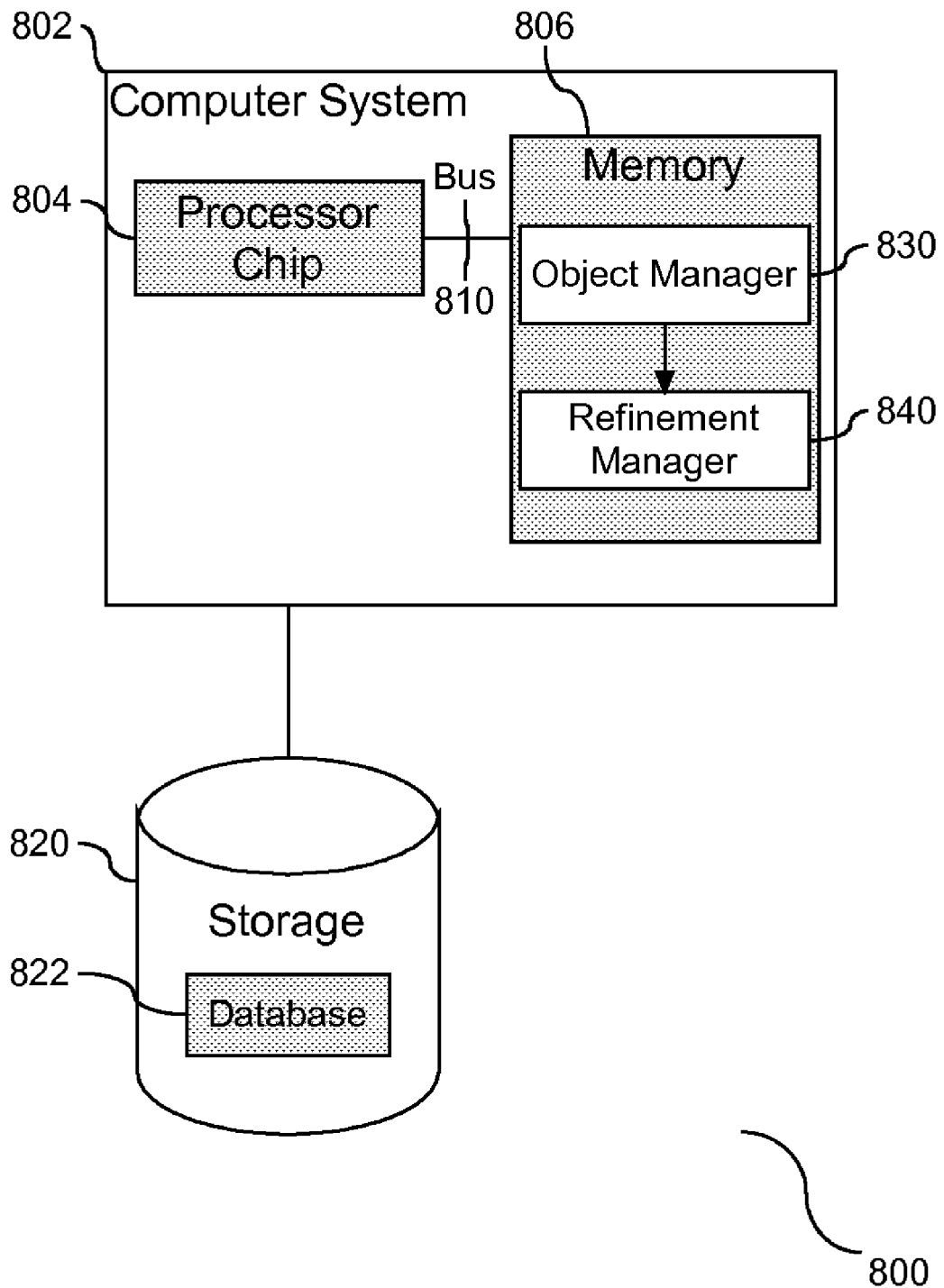
FIG. 8 is a block diagram of a set of tools to support remote communication between an operator control apparatus and a remote object.

FIG. 8 is a block diagram (800) illustrating a set of tools to support remote communication between an operator control apparatus and a remote object. As shown, a computer based system (802) is provided with a processor chip (804) coupled to memory (806) by a bus structure (810). Although only one processor chip (804) is shown, in one embodiment, more processor chips may be provided in an expanded design. Data storage (820) is provided in communication with the processor chip (804), and the data storage (820) is provided with a database (822) of one or more objects. In one embodiment, the database (822) is a geographical database to store geographical information for one or more objects of interest. The system (802) is further configured with a set of tools to manage the remote communication. More specifically, a set of managers are provided to support the functionality of the remote communication. An object manager (830) is provided local to memory (806) and is employed to match an object of interest to an object contained in a database. In addition, a refinement manager (840) is provided local to memory (806), and is employed to communicate with the object manager (830). The refinement manager (840) is responsible for refining global position and orientation data as gathered by the control unit based upon global position data stored in the database (822) for an object of interest. Both the object manager (830) and the refinement manager (840) are shown local to memory (806). However, the invention should not be limited to this embodiment. For example, in one embodiment, the object manager (830) and/or the refinement manager (840) may reside as hardware tools external to local memory (806), or they may be implemented as a combination of hardware and software. Similarly, in one embodiment, the object manager (830) and refinement manager (840) may reside on a remote system in communication with the processor chip (804). Accordingly, the managers may be implemented as a software tool or a hardware tool to manage remote communication of data, and more specifically to support an overlay of data in three dimensional spaces.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or propagation medium. Examples of a computer-readable medium include but are not limited to a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. The software implementation can take the form of a computer program product accessible from a computer-useable or computer-readable medium providing program code for use by or in connection with a computer or any instruction execution system.

It will be appreciated that, although specific embodiments of the invention have been described herein for purposes of illustration, various modifications may be made without departing from the spirit and scope of the invention. In particular, the input devices may come in different forms, including a proportional input device, such as a joystick, a rocker pad, a touch pad, a track balls, and alternative input devices. Additionally, the invention should not be limited to the mappings of the input devices to the described movement and communication with the image on the visual display. In one embodiment, there may be different mappings of the input devices to the image, or even additional mappings for different image movements. Furthermore, the invention should not be limited to a fixed set of mappings. In one embodiment, an interface may be provided to modify the mappings of the input devices. Accordingly, the scope of protection of this invention is limited only by the following claims and their equivalents.

Advantages Over the Prior Art

The embedded processor of the control unit tracks orientation and position of the control unit 10. Positioning of the control apparatus is conveyed to digital camera optics in communication with the embedded processor. Since the control unit 10 is adapted to be placed against the eyes and/or ears of the operator during use, the position and orientation of the control unit 10 is directly related to the orientation and position of the head of the operator of the control unit 10. The orientation and position information of the control unit may be projected onto the visual display of the control unit. In addition, the orientation and position of the control unit 10 may be conveyed to the remote device and the associated digital camera optics to position the camera associated with the remote device in accordance with the orientation and position of the control unit 10. Communication of orientation and position data enhances interactivity between the control unit and the remote device, aside from the environment of the remote device. In addition, the embedded processor may create a wireframe to give shape to the terrain and synthetic graphics to represent physical items in the noted relative locations, thus producing synthetic vision. The use of a wireframe and/or synthetic graphics timely conveys map, terrain, and shape data to the visual display.

Alternative Embodiments

It will be appreciated that, although specific embodiments of the invention have been described herein for purposes of illustration, various modifications may be made without departing from the spirit and scope of the invention. In particular, the control unit may be designed to communicate with a variety of remote device. For example, the remote device may be in an electronic or mechanical form with logical states mapped to corresponding input devices and motors of the control unit. The remote device may include a camera that captures live video to provide live video feedback to the control unit. In addition, the control unit may be used to download topographical and/or geographical data independent of or in conjunction with the various modes of operation. The visual display may be in the form of a liquid crystal display, or an alternative medium that enables viewing by the operator while maintaining the integrity of the control unit. Similarly, the wireless communication electronics may be in the form of wireless communication electronics in communication with the embedded processor of the control unit, or an alternative communication electronics that enables wireless communication of data between the embedded processor and a corresponding wireless communication apparatus remote from the control unit. In addition, the scope of the invention should not be limited to the input devices described together with the control unit. Alternative input devices that enable communication of data between the control unit and the remote device may be employed. Accordingly, the scope of protection of this invention is limited only by the following claims and their equivalents.

I claim:

1. An operator control apparatus, comprising:
optics in communication with a visual display, wherein said optics is adapted to provide a digital video signal;
an embedded processor in communication with said optics adapted to track change to orientation and position of said apparatus and to re-calculate data to be displayed based on said change;
a remote device in communication with said apparatus and separate from said apparatus, said remote device having an actuator adapted to be controlled by an input device of said apparatus, and said remote device to communicate global position data of an object of interest to said processor, said global position data of the object of interest recalculated with respect to the position of said apparatus; and
said processor to re-calculate location of the object of interest relative to said apparatus; and said visual display to employ an overlay to show a combination of data received from the optics local to the visual display and the remote device, said overlay to provide position and orientation in three dimensional space to a location of the object relative to location and orientation of said apparatus.

2. The apparatus of claim 1, further comprising said global position and orientation data is refined by employment of a machine vision algorithm, said machine vision algorithm to recognize said object of interest within an image received by said optics.

3. The apparatus of claim 2, further comprising an object manager to match said object of interest recognized by said machine vision algorithm to an object contained in a database.

4. The apparatus of claim 3, further comprising global position data stored in said database, and said object manager to match said global position data to a corresponding object of interest recognized by said machine vision algorithm.

5. The apparatus of claim 4, further comprising a refinement manager in communication with said object manager, said refinement manager to refine said global position and orientation data based upon said global position data stored in the database for the object of interest.

6. The apparatus of claim 2, further comprising a machine vision algorithm to recognize data selected from the group consisting of: features of terrain, environment, objects of interest, and tactical data.

7. A method for remote communication comprising:
providing a digital video feed to a visual display through optics; tracking orientation and position change of an apparatus in communication with said visual display;
controlling orientation of a portion of a device remote from said apparatus through orientation of said apparatus, wherein said remote device includes a global positioning sensor;
communicating global position and orientation data of an object of interest to said visual display, said global position data of the object of interest recalculated with respect to the position of said apparatus; and
said visual display showing a combination of data received from said optics and said remote device, said combination providing location data of an object relative to location of said apparatus.

8. The method of claim 7, further comprising refining said global position data with a machine vision algorithm and recognizing the object of interest within an image received by said optics.

9. The method of claim 8, further comprising matching said recognized object of interest with an object contained in a database.

10. The method of claim 9, further comprising storing global position data in said database and matching said global position data to a corresponding object of interest recognized by said machine vision algorithm.

11. The method of claim 10, further comprising refining said global position and orientation data of said apparatus based upon said stored global position data for the object of interest obtained from said database.

12. An article with optics in communication with a visual display, wherein said optics is adapted to provide a digital video signal, the article comprising:

a computer-readable medium encoded with instructions to be executed by a computer, said instructions comprising:

instructions to provide a digital video feed to a visual display through optics local to said visual display and remote from said visual display;

instructions to track orientation and position of an apparatus in communication with said visual display;

instructions to control orientation of a portion of a device remote from said apparatus through orientation of said apparatus; instructions to communicate global position of an object of interest as detected from said remote device to said visual display, including, recalculating said global position data of the object of interest with respect to the position of said apparatus; and instructions to present a combination of data collected by said local optics and said remote device, said combination providing location of an object relative to location of said apparatus.

13. The article of claim 12, further comprising instructions for said a machine vision algorithm to refine said global position and orientation data of said apparatus.

14. The article of claim 12, further comprising instructions for said machine vision algorithm to recognize said object within an image received by said optics.

15. The article of claim 14, further comprising instructions to match said object recognized by said machine vision algorithm to an object contained in a database.

16. The article of claim 15, further comprising global position data pre-stored in said geographical database, and instructions to match the global position data to a corresponding object recognized by said machine vision algorithm.

17. The article of claim 16, further comprising instructions to refine said global position and orientation data of said apparatus based upon said pre-stored global position data for the object obtained from said database.

18. An operator control apparatus, comprising:

optics in communication with a visual display, wherein said optics is adapted to provide a digital video signal;

an embedded processor in communication with said optics adapted to track change to orientation and position of said apparatus and to recalculate data to be displayed based on said change;

a remote device in communication with said apparatus and separate from said apparatus, the remote device in electronic form with logical states mapped to the apparatus, said remote device having an actuator adapted to be controlled by an input device of said apparatus, and said remote device to communicate global position data of objects of interest to said visual display;

said visual display to show a combination of data received from the optics and the remote device; and synthetic vision for data with respect to an object, wherein said synthetic vision provides shape to a physical item relative to location of said physical item with respect to said apparatus.

19. The operator control apparatus of claim 18, further comprising said logical states mapped to corresponding input devices of the apparatus.

* * * * *